Dec. 6, 1938.   H. J. HUNTER   2,139,584
MANUFACTURE OF CARBON BLACK
Filed Dec. 1, 1934
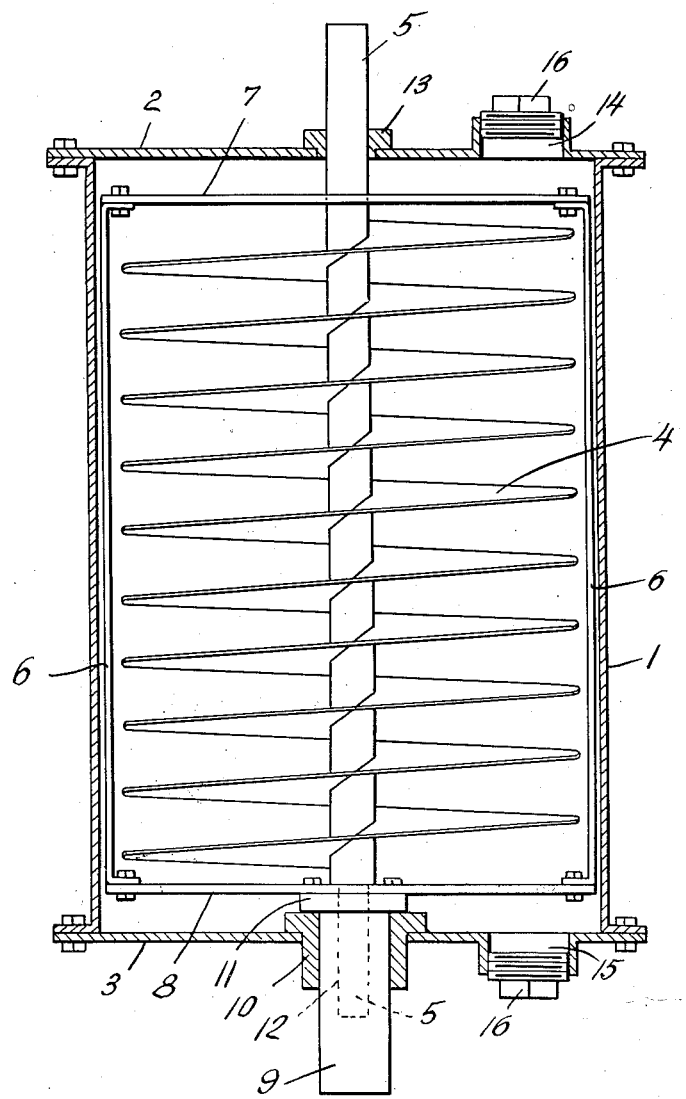
INVENTOR
Howard J. Hunter
BY
Pennie, Davis, Marvin & Edmonds.
ATTORNEYS

Patented Dec. 6, 1938

2,139,584

UNITED STATES PATENT OFFICE

2,139,584

MANUFACTURE OF CARBON BLACK

Howard J. Hunter, Fairbanks, La., assignor to Columbian Carbon Company, New York, N. Y., a corporation of Delaware Application December 1, 1934, Serial No. 755,553

3 Claims. (Cl. 134—60)

The present invention relates to the treatment of finely subdivided solids or flocculated powders such as carbon black.

In many instances the essential characteristics of such material which render them particularly valuable to the industries are their extremely fine state of subdivision and their susceptibility to ready and uniform dispersion in liquids, plastics and the like.

Carbon black, for instance, is extensively used in the manufacture of rubber compositions, phonograph records, various waxes and resin compositions, paints, varnishes, lacquers, printers' ink and the like in which a high degree of subdivision and ready and uniform dispersion are essential. Its extreme fine state of subdivision, though an essential characteristic, is a distinct handicap in the shipping, storing, and the handling of the black incidental to its use. Also, the apparent density of carbon black is so low that frequently less than 10 pounds will occupy a space of one cubic foot. This characteristic greatly increases the cost of packing, shipping and storing. In handling, the light, fluffy powder flies into the air to such an extent that there is a substantial loss of material and an annoyance to workmen in the vicinity as well as the possibility of the contamination of adjacent processes or products.

Numerous attempts have been made to overcome these objectionable properties of carbon black and render it more dense and less dusty. The majority of these attempts have, however, resulted in the destruction or impairment of those physical properties of the black essential to its intended uses. Though these objectionable properties of carbon black have been successfully eliminated in certain instances by treating the black with wetting agents, such treatment entails the extra expense of wetting and again drying the black before shipment.

My invention relates more particularly to a process whereby these finely divided solids such as carbon black, without the addition of wetting agents or binders, are reduced to small compact balls or pellets resembling shot. These pellets have a much greater apparent density than the original fluffy, powdery substance and can be subjected to ordinary handling incidental to shipment and use without the above-mentioned objectionable flying or dusting. By my process, the bulk of carbon black can be so decreased that twenty-five pounds or more will occupy only one cubic foot of space, yet the product under conditions of use is readily disintegrated into the original finely divided powder in which the essential characteristics of the original substance, i. e. ready and uniform dispersion in materials such as rubber compounds and the like, are unimpaired.

In view of overcoming these objectionable characteristics of carbon black, it has been proposed that the light, fluffy powder in a dry condition be subjected to extremely violent agitation by means of beaters whereby the individual carbon particles are subjected to intense bombardment from all directions by other carbon particles and by said beaters. I have found that such violent agitation, and the resultant severe impacts, is unnecessary and in many instances is positively detrimental to the effective production of high grade carbon black pellets of the character described above. When this intense bombardment is employed, the operation is so critical that if not carefully timed and controlled, actually results in the breaking down of the desired pellets previously formed thereby.

It is particularly detrimental to continue this intense bombardment after the desired pellets are formed. Due to the increased mass and hardness of the pellets, the impacts become increasingly severe with the consequent breaking up of said pellets into poorly formed pellets and dust particles.

All such processes known to me are essentially batch operations in which a given quantity of the powdery material is charged into the pellet forming apparatus, sometimes with previously formed pellets, and treated therein until the maximum production of the desired pellets is obtained. The operation is then discontinued, the entire batch removed and a new batch introduced. As the pellets are not all formed simultaneously, there are stages of the operation where pellets of the desired character have been formed and are present along with powdery material not yet formed into the desired pellets. Consequently, either the operation must be discontinued at a point where only a relatively small proportion of the powdery material has been reduced to pellet form or else the pellets already formed must be subjected to the treatment for a greater time than is necessary, which results in their destruction.

In those processes which employ this intense bombardment, there is this continual building up and breaking down of pellets which, though apparently a purely physical phenomenon is suggestive of the interchange of radicals in solutions of electrolytes. In both cases the effectiveness of the process involved depends upon the relative amount of the desired product obtainable therefrom.

The effectiveness of the pellet-forming process discussed above is materially lessened by this constant breaking down of the previously formed pellets before any large proportion of the powdery material has been reduced to pellet form.

I have discovered that by subjecting the powdery carbon black to a relatively mild agitation of a particular type to be fully described herein, I can, so to speak, so favorably influence the effective equilibrium point as to convert substantially all of the carbon black to the desired pellets in a minimum time period of treatment.

According to my invention carbon black or like finely divided powder, without the addition of wetting agents or binders, is subjected to a relatively mild form of agitation, fully described herein and designated "rolling impact", for a period of time, depending somewhat upon the type of material being treated, and is thereby reduced to small balls or pellets having an apparent density as high as 25 pounds per cubic foot or even higher. The product is substantially free from the objectionable dusting referred to above, and the pellets thereof are sufficiently hard to withstand ordinary handling incidental to shipment and use without disintegrating, and yet the essential characteristics of the carbon black are unimpaired.

This condition of agitation which I have herein designated "rolling impact" may be characterized, as the designation implies, as a vigorous rolling of the carbon black or like particles over other like particles until certain of these particles adhere to one another forming larger particles. Such action is suggestive of the familiar practice of building up large snowballs by rolling small particles in damp snow. However, probably due partially to the dry condition of the carbon black and to the occluded gases, the particles of carbon black adhere much less readily than particles of damp snow and repeated and more vigorous rolling impact is necessary. The amount of rolling impact required to form pellets seems to depend somewhat upon the amount of occluded gases. If the carbon black has been previously partially freed from such gases by compression or other well known means, the amount of rolling impact required to produce well formed pellets is substantially reduced.

This rolling impact may be effected by rapidly moving a flat surface on which rests a relatively thin layer of carbon black or the like. It is supposed that the action results from two opposing forces, i. e. the tendency of the powder to remain stationary due to its inertia and the opposing tendency to be carried along by the supporting surface. The effect is magnified by rapidly changing the direction of motion of the supporting surface. A convenient means for obtaining such results is a disc revolving in a horizontal plane and so arranged that the black thrown off by centrifugal force is continuously returned to the upper surface of the disc.

One means, which I have found particularly practical, for effecting this rolling impact, and which is hereinafter described in detail, is a modified form of screw conveyor vertically arranged within a cylindrical chamber of slightly larger diameter than the diameter of the screw or rotor so that material thrown off from the rotor by centrifugal force is continuously picked up by the lower portion of the rotor and thereby subjected to repeated treatment.

The particular type of agitation contemplated by the present invention is remarkably effective in the formation of pellets of the character desired and has the added advantage of being sufficiently mild to avoid or reduce to a minimum the destruction of pellets so formed. By thus eliminating or materially reducing the destruction of previously formed pellets during the treatment, I am enabled to convert substantially the entire charge of finely divided carbon black to pellet form. I am also enabled by my process to accomplish this result by a much shorter period of treatment than was possible prior to my invention.

The process of my invention will be further described with reference to the accompanying drawing, which illustrates in vertical section and somewhat conventionally one form of apparatus particularly adapted to the carrying out of the process. It will be understood, however, that my invention is not limited to the use of any particular type of apparatus.

The apparatus illustrated in the drawing comprises a vertically disposed cylindrical shell or drum 1 closed at its upper end by plate 2 and at its lower end by plate 3. These plates 2 and 3 are securely fastened to the respective ends of drum 1 by any convenient means, but I prefer to bolt these plates to the walls of the drum 1, as shown in the drawing, so that they are readily removable should access to the interior of the drum 1 be desirable. Centrally located within the drum 1 is a helical screw 4 mounted on shaft 5. Also located within drum 1 and parallel to the vertical walls thereof are scrapers 6 designed to be rotated in close proximity to the walls of drum 1 and held in position by an upper bracket 7 and a lower bracket 8. The lower bracket 8 is securely fastened to a shaft 9 supported by bushing 10 centrally located in the lower plate 3. The shaft 9 is designed with a shoulder 11 at its upper end which bears upon the upper surface of the bushing 10 so as to support the downward thrust on said shaft 9.

This shaft 9 is drilled out as indicated at 12 so as to form a bearing surface and support for the lower end of shaft 5. The upper end of shaft 5 is supported by bushing 13 centrally located in the upper plate 2.

An opening 14 is provided in the upper plate 2 for charging the apparatus and a similar opening 15 is provided on the plate 3 for discharging the product therefrom. These openings 14 and 15 are adapted to be closed by any convenient means, such as screw plugs 16.

The shafts 5 and 9 are adapted to be independently rotated at different speeds by any of the well known means.

In operation the carbon black or like material to be treated is charged into the apparatus through the opening 14, the opening 15 being closed. The opening 14 is then closed and the screw 4 rotated in a clockwise direction by means of power transmitted through shaft 5. The amount of material charged into the apparatus at one time will vary depending upon the apparent density of the material to be treated and the size of the particular apparatus. I have obtained excellent results by using a charge of a volume substantially equal to one-third the cubic capacity of the apparatus.

The optimum speed of rotation of the screw 4 will vary with the diameter of the screw and will also vary somewhat with the type of material being treated. Generally, I find that where the helical screw is less than about 2 feet in diameter there is a tendency toward the breaking up of some of the previously formed pellets if the speed of rotation of the screw is such that its peripheral speed is materially over 800 feet per minute. This is apparently caused by the pellets being thrown too forcefully against the walls of the apparatus due to excessive centrifugal action of the smaller screw at the higher speeds of rotation. On the other hand, if the peripheral speed of such screws is reduced materially below 300 feet per minute, the screw tends to cut through the black without imparting to it the desired rolling impact. In most instances I have found that with screws of this size a peripheral speed of 500 to 700 feet per minute gives excellent results.

Where screws of greater diameter are used, the peripheral speed may advantageously be increased materially above 800 feet per minute. For instance, I have found that in an apparatus having a screw approximately 5 feet in diameter a peripheral speed of 900 feet per minute gives excellent results.

I have found, particularly with larger apparatus, that if the speed of rotation is reduced too greatly the materials resting on the inner portion of the flights of the screw are not subjected to sufficiently vigorous action to give the best results or greatest efficiency.

In view of the above disclosure, the optimum speed of rotation for any particular size of apparatus can be readily determined by simple tests.

The screw 4 in many respects resembles an ordinary screw conveyor but differs from such conveyors commonly used in that it has an unusually low pitch and consequently affords relatively slight conveyor action. The optimum pitch of the screw will vary with the size of the apparatus. While I have found that the desired rolling impact can be imparted to the carbon black by means of helices varying in pitch from 5 to 20° from the horizontal, for mechanical reasons the pitch should be as low as possible without having the flights of the screw so close together that the material being treated becomes packed between them. For example, in working with a small apparatus the outer shell of which was six inches in diameter, a helix with a 5° pitch was used, the flights of this helix being less than one inch apart. While satisfactory pellets were produced by this apparatus, there was a tendency for the carbon black to pack between the flights. I have found that with a helix approximately 21 inches in diameter satisfactory results are obtained where the flights rise about 8° from the horizontal, which makes them approximately three inches apart.

It is desirable to design the helix so that the flights are as close together as possible without objectionable packing of the material between the flights, for in this way the apparatus is made more compact, and for a given size apparatus a greater area of moving surface to impart the desired rolling impact to the carbon black is obtained.

To avoid the accumulation of the carbon black on the walls 1 scrapers 6 are provided. Only two of these scrapers are shown in the drawing, but in practice I prefer to use four spaced 90° apart. The scrapers are caused to rotate by power transmitted through the shaft 9 and normally the speed of rotation is much slower than that of the helical screw. The operation may be continuous or intermittent and in the treatment of some materials I have found the operation of these scrapers unnecessary for long periods of time. When operated continuously a speed of approximately four to six R. P. M. has been found to give satisfactory results.

The scraper mechanism should be of rigid construction so as to avoid distortion. The scraper bar 6 may be conveniently constructed from angle iron. I have obtained satisfactory results in apparatus of this type where a clearance of one-eighth inch is allowed between the scraper bar 6 and the walls 1 of the drum.

The helix 4 should likewise be of rigid construction. The clearance between the outer edge of the helix and the inner surface of the walls 1 should, of course, be sufficient to permit the free operation of the scrapers. If the clearance is too great the helix tends to cut through the material being treated rather than picking it up and carrying it upward. In normal operation the black is carried upward along the flights of the helix until it is thrown outwardly from the flights by centrifugal force. The material then falls downwardly through the clearance between the outer edge of the helix and the inner surface of the wall 1. Accordingly, this clearance must be sufficient to allow the free downward passage of material being treated. In small apparatus of approximately twelve inches in diameter, I have found a clearance of ¼ to ½ inch sufficient for this purpose. In large apparatus approximately two feet in diameter a clearance of approximately one inch has given satisfactory results. In still larger apparatus approximately five feet in diameter I have found clearances as great as two to two-and-one-half inches very satisfactory.

The material being treated by my process in the apparatus just described is subjected to a cycle of operations. Carbon black, for instance, is picked up by the helical screw and carried upwardly along the flights thereof. Also, the influence of centrifugal force tends to cause the black to travel outwardly along the flight so that the resultant motion of the black is generally upwardly and outwardly along the flight until it reaches the outer edge of the flight and falls downwardly through the clearance between the helical screw and the walls of the drum to be again picked up by the screw and again caused to travel this path along the flight of the screw in this upwardly and outwardly direction. In this manner the black is repeatedly subjected to the rolling impact previously referred to.

Where the carbon black being treated by this process is of a light fluffy nature of low apparent density, the first noticeable effect of the treatment is an increase in its apparent density. As the operation continues the finely divided carbon black is gradually formed into small irregularly shaped pellets, at first very soft but of materially greater apparent density than the original fluffy carbon black. Upon continued treatment these irregularly shaped pellets become harder and more nearly spherical. As previously stated, the required period of treatment varies in length with the nature of the charge. Where the apparent density of the carbon black has previously been increased by pressing or by other means, the period is considerably shortened, as will more fully appear from the specific illustrations of my invention, which are given below. The desired time of operation for any particular charge is readily determined by taking samples of the material being treated.

I have found that the required period of treatment to obtain the optimum results with various types of carbon black is frequently materially shortened by introducing into the apparatus along with the material being treated a relatively small proportion of previously formed pellets of like material, or by leaving in the apparatus a small amount of the pellets from the previous batch. Where the carbon black to be treated by my process is of very low apparent density, for instance ten pounds per cubic foot or less, I find the introduction of a small proportion of previously formed pellets into the charge particularly advantageous. Though I cannot definitely explain the function of these previously formed pellets, they appear to aid the finely divided black in climbing the flights of the helical screw whereby they are more effectively subjected to the repeated rolling impact.

One advantage of my process is its ready adaptability to continuous operation as opposed to batch operation. I have discovered that in carrying out my process in apparatus of the type illustrated, the pellets and imperfectly formed pellets have a greater tendency to migrate to the upper part of the apparatus than has the black still in powder form. With slight modifications of the apparatus shown, the carbon black to be treated may be continuously fed into a lower zone of the apparatus and the pellets continuously removed from an upper zone thereof and passed to storage, or, if desirable, to a second apparatus for further treatment.

The following runs are given as specific examples of my invention:

Example I

The apparatus employed was substantially as shown in the accompanying drawing. The drum was approximately three feet high and two feet in diameter. The helical screw was 21.5 inches in diameter and consisted of ten flights placed three inches apart and driven at a peripheral speed of 500 to 700 feet per minute. The scraper was operated at 4 to 6 R. P. M. This apparatus was charged with approximately 20 pounds of carbon black, apparent density 10 to 12 pounds per cubic foot, and three pounds of previously formed pellets of such size that they would pass through a 40 mesh screen but be retained on a 60 mesh screen. This charge loosely filled the apparatus approximately one-third full. The process was started and samples taken from time to time from the discharge opening at the bottom of the apparatus. At the end of twelve minutes of operation the process was completed. The product consisted of well formed pellets having an apparent density of 23 pounds per cubic foot and of the following size:

| | Percent |
|---|---|
| Remaining on 40 mesh screen | 29.1 |
| Remaining on 60 mesh screen | 44.2 |
| Remaining on 80 mesh screen | 15.6 |
| Remaining on 100 mesh screen | 7.0 |
| Through 100 mesh screen | 4.1 |
| | 100.0 |

The material passing through the 100 mesh screen consisted of small irregularly shaped pellets rather than dust, while the larger pellets were all well formed and of sufficient hardness to withstand handling incidental to shipment and use.

Example II

This run was made on the same apparatus and under the same conditions described under Example I except the charge consisted solely of highly compressed carbon black. The time required to produce pellets of the same general character as described under Example I was only three minutes.

The following runs were made in an apparatus somewhat similar to that described in Example I. The diameter of the drum was 12 inches. The diameter of the helical screw was approximately 11 inches. The flights of the helical screw were approximately 1¾ inches apart, rotated at a peripheral speed of 675 feet per minute. The scraper was rotated at 14 R. P. M.

Example III 8 pounds of carbon black, which had been previously pressed to remove a considerable portion of occluded gases, was charged into the above described apparatus without the addition of previously formed pellets. At the end of 15 minutes of operation, 99% of the carbon black had been converted to pellets of the desired hardness.

Example IV 8 pounds of a light fluffy carbon black of apparent density of 10 to 12 pounds per cubic foot were charged into the apparatus from which the pellets from the previous batch had not been thoroughly cleaned. At the end of 70 minutes of operation 96% of the charge had been formed into pellets of the desired hardness and of the following size:

| | Percent |
|---|---|
| Remaining on 40 mesh screen | 80.0 |
| Remaining on 100 mesh screen | 11.0 |
| Remaining on 200 mesh screen | 9.0 |
| | 100.0 |

I claim:

1. The process of treating finely divided carbon black which comprises repeatedly subjecting said carbon black in a dry condition to the action of a vertically arranged helical screw, rotating at a peripheral speed in excess of about 300 feet per minute in a direction to lift the carbon black, and the flights of which have a pitch such that during rotation particles of carbon black move upwardly and outwardly thereon with a rolling movement such as to effect compacting of the particles of carbon black by said rolling movement on the flights into substantially dustless, free-flowing pellets without substantially subjecting the carbon black to mechanical pressure, said particles of carbon black, during the rotation of the screw, falling back and being re-raised by said screw until they are formed into pellets having an apparent density substantially greater than the apparent density of the original carbon black and are strong enough to maintain their pellet form during normal transportation.

2. The process of treating finely divided carbon black to form pellets, comprising repeatedly subjecting said carbon black in a dry condition and in the presence of previously formed pellets to the action of a vertically arranged helical screw, rotating at a peripheral speed in excess of about 300 feet per minute in a direction to lift the carbon black, and the flights of which have a pitch such that during rotation particles of the carbon black and said previously formed pellets move upwardly and outwardly thereon with a rolling movement such as to effect compacting of the particles of carbon black by said rolling movement on the flights into substantially dustless, free-flowing pellets without substantially subjecting the carbon black to mechanical pressure, said particles of carbon black, during the rotation of the screw, falling back and being re-raised by said screw until they are formed into pellets having an apparent density substantially greater than the apparent density of the original carbon black and are strong enough to maintain their pellet form during normal transportation.

3. The process of treating finely divided carbon black comprising repeatedly subjecting said carbon black in a dry condition to the action of a vertically arranged helical screw, the flights of which are inclined not more than 20° from the horizontal, elevating the particles of carbon black by rotating said screw at a peripheral speed in excess of about 300 feet per minute in a direction to lift the carbon black, whereby particles of carbon black are caused to move upwardly and outwardly on the flights of the screw with a rolling movement, such as to effect compacting of the particles of carbon black by said rolling movement on the flights into substantially dustless, free-flowing pellets without substantially subjecting the carbon black to mechanical pressure, said particles of carbon black, during the rotation of the screw, falling back and being re-raised by said screw until they are formed into pellets having an apparent density substantially greater than the apparent density of the original carbon black and are strong enough to maintain their pellet form during normal transportation.

HOWARD J. HUNTER.